No. 609,466. Patented Aug. 23, 1898.
A. J. ROSSI.
ALLOY OF IRON AND TITANIUM AND PROCESS OF PRODUCING IT.
(Application filed June 5, 1895.)
(No Model.)
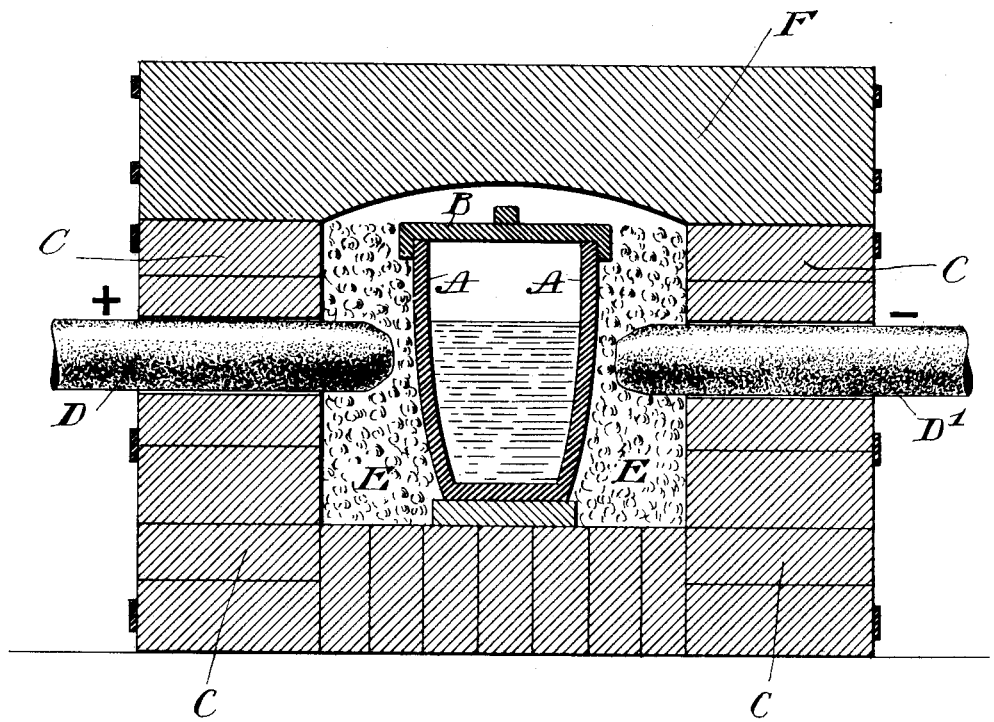
WITNESSES:
Frank S. Ober
Frederick J. Benjamin
INVENTOR
Auguste J. Rossi
BY
Walter J. Simonds
ATTORNEY

UNITED STATES PATENT OFFICE.

AUGUSTE J. ROSSI, OF NEW YORK, N. Y., ASSIGNOR OF ONE-HALF TO JAMES MacNAUGHTON, OF ALBANY, NEW YORK.

ALLOY OF IRON AND TITANIUM AND PROCESS OF PRODUCING IT.

SPECIFICATION forming part of Letters Patent No. 609,466, dated August 23, 1898.

Application filed June 5, 1895. Serial No. 551,720. (No specimens.)

*To all whom it may concern:*

Be it known that I, AUGUSTE J. ROSSI, of the city, county, and State of New York, have invented a new and useful article of manufacture, being a compound or alloy of iron and titanium, and new and useful processes for its production, of which the following is a specification.

The object of my invention is to produce in an economical and effective manner an alloy or compound of titanium and iron associated with as small a quantity of carbon as can be conveniently and practically effected and in which the titanium is contained in industrially important quantities—that is to say, not less than five per centum of the mass—and the iron also enters into the compound in substantially important quantities, constituting, say, for instance, not less than ten per centum of the mass, and which iron thus serves as a vehicle for the titanium of the compound. Such a compound may be fitly termed a "ferrotitanium alloy," and in the production of this novel article I make use of my new processes hereinafter described.

It has long been known that iron, cast-iron, steel, and the like derived from titaniferous iron ores possessed in a remarkable degree the qualities of strength and toughness; but the expense and difficulties of treating such titaniferous ores had proved practically insurmountable until my invention of the process for reducing such ores secured to me by Letters Patent of the United States No. 486,941, dated November 29, 1892. By means of the process last mentioned it has been rendered possible to obtain iron from such titaniferous ores, and such iron has contained accidentally or incidentally, to its great advantage, a very small inherent quantity of titanium, exceptionally one per centum of the entire mass or possibly a little more than that. Notwithstanding the small quantity of titanium thus combined incidentally with the iron thus reduced from such titaniferous ores, the special qualities of resistance and hardness have been so noticeable in such iron as to render it desirable to produce, if possible, an article containing titanium in industrially important quantities—that is to say, not less than five per centum of the weight of the mass—so as to insure its utilization in the treatment on an industrial scale of large bodies of ordinary iron and steel not containing titanium.

Until recently it has proved substantially impossible to produce metallic titanium to any extent whatever. Now, however, as is well understood, small quantities of that metal have been produced in the laboratory by subjecting rutile in the presence of carbon to the intense heat of an electric arc of extremely high amperage, but at an expense entirely prohibitory as far as commercial production for use in the industrial arts and manufactures was concerned.

I have discovered that so far as the application of titanium in the improvement of iron and steel is concerned the same advantages may be secured by producing preliminarily, instead of separate metallic titanium, a combination of iron and titanium containing incidentally, though not designedly, more or less carbon, the titanium being present in such industrially important quantities—say not less than five per centum of the entire mass—as to justify the designation of such combination as an "alloy of titanium;" and I have also discovered that such combination or alloy may be economically and successfully produced by subjecting to an intense heat— say at or above the melting-point of platinum—in the presence of carbon a mixture of molten iron and some highly-titaniferous compound not necessarily containing iron, such as titanium dioxid, or a highly-titaniferous slag not necessarily containing iron, with metallic iron or iron in ore or with a highly-titaniferous iron ore containing both iron and titanium and in which the oxid of iron, being first reduced by carbon to the state of iron, may form the vehicle or support for titanium without the addition of pig-iron, provided the said elements are during the exposure to the said heat so long and so supported in relation to each other as to insure the reduction of the titaniferous compound while surrounded by and in a bath of the molten iron, so as to insure the combination with the iron of the titanium reduced from the titanic compound by the action of the carbon under said heat.

Metallurgists will of course understand that it is impossible to prescribe any absolute rule or ratio of proportion for the various elements used in the production of my novel alloy, containing titanium in industrially important quantities, by the processes which I have discovered. Such proportions and ratios will of course vary more or less, according to the special conditions of each particular case. It seems enough for me to state that the alloy in question may be successfully produced as follows:

First. One way of producing my novel manufacture or alloy is to mix together carbon and some one of the titaniferous or well-known ilmenite ores containing a large amount—say thirty-five to sixty per centum and more—of iron in the form of iron oxids and some ten to twenty and even forty per centum of titanic acid and to subject continuously the aforesaid mixture to any very high temperature—say at or above the melting-point of platinum, or, say, not less than 3,500° Fahrenheit—such as may be attained, for instance, by the use of an electric current or other means, from which treatment and process it is possible to secure a compound of iron and titanium containing from eight to nearly thirty per centum of titanium—ferrotitanium.

To illustrate with even greater definiteness the principles involved in my improvements, I call attention to the following specific combinations of elements and ingredients which I have found successful in producing my desired novel alloy. I have, for instance, found it useful to intimately mix together ilmeno rutile, a mineral containing some ten per centum of oxid of iron and ninety per centum of titanic acid, with powdered charcoal and molten iron in about the following proportions, viz: ilmeno rutile, sixteen, containing 8.64 titanium; charcoal, five; cast-iron, one hundred, containing about ninety-five per centum iron, and the balance silicon and carbon. I support this mixture so that the constituents may be retained in contact with each other while acted upon—as, for instance, in a graphite crucible—and, thus supported, by subjecting them to the action of an intense heat, as aforesaid, it is possible to obtain in some five or six minutes an alloy containing iron, 90.04; titanium, eight; carbon, &c., two. In the treatment thus described might be substituted for the ilmeno rutile any other very highly titaniferous ore.

Second. I have likewise found it useful to make an intimate mixture of highly-titaniferous iron ore containing twenty per centum titanic acid and some sixty per centum of metallic iron with powdered charcoal in substantially the proportions of one hundred parts of said ore to twenty-five parts of such charcoal, and, as aforesaid, supporting and submitting same to heat or electric current of similar intensity, as in the previous treatment described, it will be found that almost instantly the iron oxid will be reduced and run off in globules, forming a metallic bath or support of molten iron, and that after some ten minutes of further action there will be obtained a clean, well-melted mass of iron of fine grain, very hard, analyzing as follows: titanium, 16.50; iron, 77.40; carbon, silicon, &c., by difference, 6.10; total, 100.

Third. I have likewise found another treatment useful for the production of my desired novel manufacture or alloy. In this instance I have discovered the efficiency of utilizing as the supplying source of the titanic acid a hitherto waste product—to wit, the highly-titanic slag containing some forty per centum to sixty per centum of titanic acid, as such slag is run in the aforesaid hitherto-patented process of smelting titaniferous ores in the blast-furnace. This slag does not, as is proper, contain any but a very small fraction of iron, scarcely one to two per centum. The slag I mix intimately with powdered carbon, and I also add, in order to produce the molten-cast-iron bath, a certain quantity of pig-iron, say, in the following proportions, viz: for a slag containing fifty per centum of titanic acid; slag, one hundred and thirty; carbon, twenty-five; pig-iron, one hundred, containing about 3.50 to four per centum carbon, some three per centum of silicon, the balance, about ninety-three per centum, being iron. Subjecting this again to the aforesaid heat or action of the electric current specified as used in the previous cases, there may be obtained, in less than ten minutes, large well-melted globules of the alloy, clean from slag, and showing a silvery fracture, which, analyzed, will contain substantially as follows, viz: titanium, 27.53; silicon, 2.30; iron, 59.15; carbon, 10.41. The silicon appearing in the resultant alloy is in this instance supplied by the pig-iron.

Fourth. I have also found it useful in producing my desired compound to still further vary the treatment as follows, viz: Taking the aforesaid highly-titanic slag as the main source of the supply of titanic acid and intimately mixing the same, together with the proper amount of carbon, and adding the aforesaid titaniferous ores as an ingredient, (instead of the pig-iron last aforesaid,) said ore containing, say, twenty per centum of titanic acid and, say, sixty per centum of iron, in the proportions of approximately one hundred and twenty-five parts of said slag to one hundred and sixty parts of said ore intended to supply, by its reduction to iron by charcoal, the iron necessary to form the titanium alloy and, as aforesaid, supporting and subjecting such mixture to the aforesaid heat of an electric current as aforesaid, equally satisfactory results will be obtained as in the previous treatment.

Further instances might doubtless be multiplied; but the foregoing I deem amply sufficient to instruct persons skilled in metallurgy in methods whereby can be produced my novel manufacture or compound of iron and titanium in industrially important quantities. It should be observed generally that in every case the quantity of titanium in my novel article will depend upon the proportional amount of the titaniferous ores, slag, molten iron, or ilmeno rutile added and that the production of the titanium can be consequently varied within wide limits to suit each particular case, it being understood that the object of my invention is to produce the alloy referred to containing such a proportion of titanium as to be of industrial importance—that is to say, not less than five per centum of the mass in any case. Care will, however, be observed to so regulate the proportions and support the mixture that a sufficient amount of molten iron as a bath may be retained continuously present to serve as the vehicle or inducement for the otherwise industrially impracticable reduction, melting, or fusing of the titanium, and care will also be taken to regulate the amount of carbon by experiment to meet the varying requirements of different ores, slags, irons, or other ingredients which may be involved in each instance.

For the purpose of producing the bath of molten iron referred to any convenient iron may be employed—as, for instance, cast-iron may be used, providing it is low in silicon—such, for instance, as the cast-iron produced from titaniferous ores through my patented process referred to—and in such case cast-iron will be of advantage as contributing to the mixture part of the carbon requisite for the reduction of the oxid of titanium, or, on the other hand, where such cast-iron is not available any form of wrought-iron with added carbon may be employed. In other cases the bath will be furnished or produced by the iron derived from the reduction of the iron oxid of the ore by carbon, as aforesaid; but I prefer, so far as my experience has gone, to use in every instance a bath or vehicle produced or at least partly produced by the direct addition of some iron to the mixture.

I prefer to produce this novel manufacture of mine—to wit, my ferrotitanium—by treatment with an electric current, as aforesaid. As I have intimated, however, I believe that the temperature required in these conditions of treatment is below that generated by electricity and that my process may be successfully applied by the use of temperatures sufficiently high otherwise derived—such as, for instance, by the use of the oxhydric flame or in an open-hearth furnace, utilizing a producer-gas or otherwise in any other well-known way for securing temperatures as high at least as the melting-point of platinum, or, say, not less than 3,500° Fahrenheit.

The utility of the novel product of my process will be manifest. My ferrotitanium incorporates in itself and in such constituent combination and quantity with other metals as to be readily utilized in the manufacture of iron and steel the much-desired titanium. The accompanying iron is in no way detrimental in such application, and the compound thus economically and readily produced will enable the iron and steel worker to conveniently and economically incorporate into his molten metals and their resultant products such proportion of titanium as is required, in order to impart the desirable qualities resulting from the incorporation of this particular metal.

It will of course be understood that as convenience or other conditions may dictate the iron to be utilized as the supporting-bath when molten may be either preliminarily reduced to the molten condition, after which the other ingredients are added, or may be, in the first instances, introduced cold as pig or other iron in the charge simultaneously with the other ingredients, it being of course more readily affected by the heat than the others and reduced to molten condition before any of the subsequent reactions take place. My invention does, however, involve the continuous support of the ingredients and constituents referred to in operative relation to each other while exposed to the aforesaid heat until the reactions shall have been duly accomplished, since without such support and retention the production of the alloy in question containing titanium in industrially important quantities would be impracticable.

I have spoken in this specification of my preference for utilizing the electric current as the source of the high temperatures to which I have referred. This may be done in any of the numerous well-known ways which may prove most convenient, according to circumstances. For instance, there may be employed a form of "electric furnace," so called, consisting, broadly, of bottom, walls, and a removable cover of refractory material inclosing a central cavity or chamber containing a covered pot or crucible, within which crucible are charged the materials to be treated. Electrical insulation of the furnace having been secured in any convenient manner, the electrodes are introduced through proper openings into said chamber through the walls of the furnace, and intermediate between said walls and the inner crucible is packed a quantity of coarsely-broken fragments of charcoal. The electric current being now supplied, the crucible and its contents will be raised to the high temperature necessary for the latter's reduction. Such an apparatus as I have described may be used to melt one charge after another or, preferably, in any convenient way adapted to operate in a continuous manner, as by providing a proper inlet for the materials and a suitable outlet for the melted products. By the use of such contrivance I have succeeded in obtaining as the result of one charge from fifty to one hundred pounds of my ferrotitanium alloy containing fifteen per centum of metallic titanium.

The accompanying drawing will serve to illustrate one form of such an apparatus, whereby the heat of the electric current may be utilized as aforesaid.

The drawing in question illustrates a central vertical cross-section, the transverse cross-section at right angles to this one being substantially similar, except that it does not show the carbon electrodes.

A represents a graphite crucible; B, the removable cover; C, the furnace proper, constructed, preferably, of refractory material, such as magnesia brick, (or less refractory material might be employed,) and provided with a refractory lining.

D D' are electrodes connected with proper source of electrical current and so arranged as to be movable and adjustable, such arrangement, as is well understood, being necessary in order to initiate the arc. Loosely packed between the exterior walls of the crucible and the interior of the furnace proper and the electrodes is a quantity of small pieces of charcoal E E, tending to produce a multiplicity of subarcs.

F is the cover of the furnace, likewise constructed of some highly-refractory material.

The furnace and crucible being uncovered the elements of the charge are placed in the latter, as aforesaid, the covers are restored to position, the electric current turned on, and the electrodes proper adjusted until the arc has been started inside of the furnace, whereby the crucible and its contents are raised to the high temperature required for the operation of my process and the production of my novel product, as aforesaid. After the requisite temperature has been sufficiently maintained the covers are removed, the crucible lifted out, and the product cast in an ordinary mold and a new charge inserted. By the use of such apparatus I have succeeded in obtaining in a ferrotitanium alloy forty-three and one-half per centum of titanium and some forty-nine or fifty per centum of iron, and by using apparatus slightly varying in details there has been obtained by the application of my said process and as the result of a single charge between fifty and one hundred pounds of my ferrotitanium alloy.

I am aware that it has been sought to produce an alloy of titanium and iron by mixing with molten pig-iron while cooling titaniferous iron sand to produce a species of briquettes and thereafter charging a blast furnace or cupola in part with such briquettes, the oxid of titanium being in such case unable to a great extent, if not entirely, to be reduced by the carbon while in the furnace until at least, if at all, after the pig-iron forming the briquette has melted, at which point, owing to its specific gravity and condition of non-support in the blast furnace or cupola, the said pig-iron will immediately drop into the hearth, leaving the titaniferous sand by itself in the same condition as any other ore charged directly in the furnace with the fuel and fluxes. I am also aware that it has been asserted that a so-called "ferrotitanium" has been heretofore exhibited in small irregular lumps up to, say, one inch cube, and said to contain twenty-two per centum titanium; but I am not aware that any disclosure has been made respecting the composition of or possibility of producing such article nor that it has ever been utilized except as a metallurgical curiosity.

I am aware that a so-called "alloy" of titanium and iron has been heretofore directed to be produced by smelting in a blast-furnace iserine, which is a naturally-pulverized titaniferous iron ore, consisting, essentially, of titanic acid and oxid of iron, and that, as aforesaid, a pig metal containing but a very small quantity of titanium has resulted from the application of my process of reducing titaniferous iron ores described in my said Letters Patent No. 486,941; but I do not know that in either of these cases it has been possible to produce a mixture which could be properly termed an "alloy"—that is, containing titanium in commercially important proportions, nor, indeed, in any more than merely incidental quantity, say, exceptionally even not to exceed one to two per centum of the entire mass of the mixture or resulting pig metal, and thus entirely insufficient to be useful for the purpose of seasoning with its surplus titanium other non-titaniferous iron; nor, should it prove that in some cases the smelting of iserine has produced an alloy containing titanium in greater proportion, am I aware that such useful result has been heretofore accomplished or been possible prior to my invention by the use of any other materials or elements than those specifically constituting such iserine and in their specific natural physical condition and arrangement. I am also aware that it has hitherto been suggested that the reduction of titanium might be possibly accomplished by subjecting some refractory metallic compound containing it commingled with subdivided carbon, but without the presence of molten iron, to the electrolytic action of an arc whose electrodes are separated one above the other. I am also aware that "minute residues" containing a large proportion of so-called "carbid of titanium" are asserted to have been separated from their containing pig-iron, but only in quantities so insignificant as to be "barely sufficient for a microscopic slide." It is also asserted that the quantitative analysis of such carbids has disclosed the presence of iron; but the proportion of this has been so minute (less than four per centum of the mass) as to preclude its practical operation in any sense as a vehicle in the way in which I use it and to justify its being regarded merely as one of a number of impurities associated with the carbid. I do do not, therefore, now wish to be understood as claiming any of these prior matters as constituting any part of my invention.

What I claim as new, and desire to secure by Letters Patent, is the following, viz:

1. The process of producing a new compound or alloy of titanium and iron, containing some carbon, and titanium in industrially important porportions, that is to say in excess of five per centum of titanium, which consists in supporting in a bath of molten iron and while subjected to intense heat, say not less than 3,500° Fahrenheit, a mixture of carbon and of titanic acid, substantially as and for the purposes described.

2. The process of producing a new compound or alloy of titanium and iron, containing some carbon, and titanium in industrially important proportions, that is to say in excess of five per centum of titanium, which consists in supporting in a bath of molten iron and while subjected to intense heat, say not less than 3,500° Fahrenheit, a mixture of carbon and of a compound, containing titanic acid as one of its important constituents, substantially as and for the purposes described.

3. The process of producing a new compound or alloy of titanium and iron, containing some carbon, and titanium in industrially important proportions, that is to say in excess of five per centum of titanium, which consists in supporting in a bath of molten iron and while subjected to intense heat, say not less than 3,500° Fahrenheit, a mixture of carbon and titaniferous iron ore, substantially as and for the purposes described.

4. As an article of manufacture, a compound containing an important quantity of iron, say not less than ten per centum of the mass, some carbon, and titanium in industrially important proportions, that is to say, not less than five per centum of the mass, substantially as and for the purposes described.

Dated June 1, 1895.

AUGUSTE J. ROSSI. [L. S.]

Witnesses:
A. BALFOUR,
A. W. SLOCUM.